United States Patent [19]

Fujimoto et al.

[11] 3,846,380

[45] Nov. 5, 1974

[54] POLYAMINO ACID DERIVATIVES AND COMPOSITIONS CONTAINING SAME

[76] Inventors: Yasuo Fujimoto, 1177-4, Ichigao-cho, Midori-ku, Yokohama-shi, Kanagawa-ken; Masayuki Teranishi, Yamazaki-danchi 7-9-108, 2130, Yamazaki-cho, Machida-shi, Tokyo, both of Japan

[22] Filed: Oct. 31, 1972

[21] Appl. No.: 302,417

[52] U.S. Cl.............. 260/78 A, 252/352, 252/356, 252/357, 260/112.5, 424/70, 424/78
[51] Int. Cl............................................ C08g 20/08
[58] Field of Search...................... 260/78 A, 112.5

[56] References Cited
OTHER PUBLICATIONS

Chem. Abstracts, Vol. 59, 1963, 7758h, 7759a, Isemura et al.

*Primary Examiner*—Howard E. Schain

[57] ABSTRACT

Polyamino acid derivatives having hydrophobic and hydrophilic substituents in their side chains are prepared by reacting a polyimide with at least one primary or secondary aliphatic amine and hydrolyzing the resulting polyimide derivative with alkali. The polyamino acid derivatives are useful as surface active agents.

19 Claims, No Drawings

POLYAMINO ACID DERIVATIVES AND COMPOSITIONS CONTAINING SAME

This invention relates to a process for preparing polyamino acid derivatives having hydrophobic substituent groups and hydrophilic substituent groups in their side chains and to compositions containing the polyamino acid derivative as an active ingredient. The polyamino acid derivatives of this invention are useful as surface active agents.

The polyamino acid derivatives of the present invention can be represented by the formula:

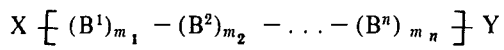

wherein X and Y are terminal groups derived by reacting the terminal groups of a polyimide with at least one primary or secondary amine and hydrolyzing the resulting polyimide derivative; $B^1, B^2 \ldots B^n$ represent the following structural units

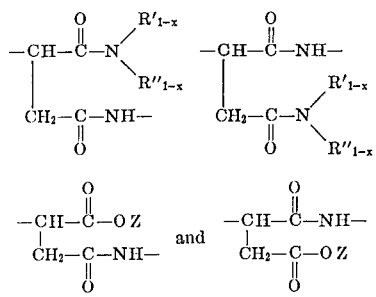

wherein $R_1', R_2', \ldots R_x'$ are the same or different and each represents a hydrogen atom or an alkyl or alkenyl group having 1–20 carbon atoms; $R_1'', R_2' \ldots R_x'$ are the same or different and each represents an alkyl or alkenyl group having eight to 20 carbon atoms and Z represents a hydrogen atom, an alkali metal, an alkaline earth metal or an ammonium ion; and $m_1, m_2 \ldots m_n$ represent an integer from 0 to 200 provided that $m_1, m_2 \ldots m_n$ are not all zero at the same time.

The polyamino acid derivatives of the present invention are prepared by allowing a polyimide compound, having as a main component a

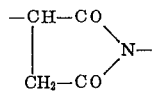

unit and having a molecular weight in the range of 300 to 30,000, to react with at least one of the primary or secondary aliphatic amines represented by the general formula

wherein R' represents a hydrogen atom or an alkyl or alkenyl group having one to 20 carbon atoms and R" represents an alkyl or alkenyl group having eight to 20 carbon atoms, and hydrolyzing the resulting polyimide derivative.

The polyimide compound used as the starting material is prepared by heat condensation of one or more compounds selected from the group consisting of aspartic acid; ammonium salts or (mono- or di-) amides of aspartic acid, malic acid, maleic acid and fumaric acid; a combination of aspartic acid and ammonia; a combination of malic acid and ammonia; a combination of maleic acid and ammonia and a combination of fumaric acid and ammonia.

The intermediate formed by reacting the polyimide with the amine has the general formula:

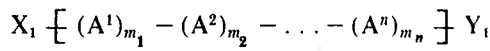

wherein $X_1$ and $Y_1$ are terminal groups derived by the reaction of the terminal groups of the polyimide compound described above with an aliphatic amine, and $A^1, A^2 \ldots A^n$ represent the following structural units:

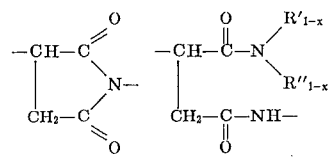

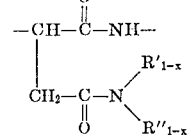

wherein $R_1', R_2', \ldots R_x'$ are the same or different and each represents a hydrogen atom or an alkyl or alkenyl group having one to 20 carbon atoms and $R_1'', R_2'', \ldots R_x''$ are the same or different and each represents an alkyl or alkenyl group having eight to 20 carbon atoms, and $m_1, m_2, \ldots m_n$ represent integers from 0 to 200, $R_{1-x}'$ and $R_{1-x}''$ correspond respectively to R' and R" of the amine component of the reaction mixture. In the case where, for example, three kinds of amines are employed in the reaction, there will be combined at least one of three kinds of

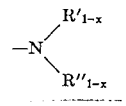

in one molecule of the reaction product.

It is known from Japanese Pat. Publication No. 15046/62, that conventional surface active agents based on polyamino acids are characterized by having long chain aliphatic hydrocarbon groups at their terminals as the hydrophobic substituent, but the present surface active agent is a novel type surface active agent based on a polyamino acid having amide bonds in the main chain and hydrophobic substituents consisting of long chain aliphatic hydrocarbon groups as well as hydrophilic substituents in the side chains. As will be described hereinafter, the present surface active agent is easily prepared and surface active agents having various properties may be readily synthesized by selecting the amount and the kind of aliphatic hydrocarbon groups. In addition, the polyamino acid derivatives are excellent surface active agents and may be used for various purposes.

Heretofore, a process has been known for preparing a surface active agent having a polyamino acid as its base by polymerizing the N-carboxylic anhydride of an amino acid using a long chain aliphatic amine or its derivative, or a long chain aliphatic alcohol as a polymerization initiator to obtain a surface active agent in the form of a polyamino acid derivative having a hydrophobic substituent group as the terminal group (Japanese Pat. Publication No. 15046/62). However, this process has disadvantages as described below. Generally, N-carboxylic anhydrides of amino acids are prepared by allowing an amino acid to react with phosgene in a suitable solvent, but in such cases, several recrystallizations are necessary or a skilled isolation operation is required in order to recover the N-carboxylic anhydrides [Journal of Polymer Science, A-2 4 183 (1966)]. Further, N-carboxylic anhydrides of amino acids are unstable in the presence of water, and thus must be handled carefully. In addition, the costs are relatively high, because of the use of phosgene.

As a result of various studies on a process for producing a surface active agent based on polyamino acids, in order to overcome the disadvantages of the conventional processes, the present inventors have found a novel process, which is excellent from operational and economical viewpoints The desired product is obtained by allowing polyimide compounds obtained by heat-polymerizing certain organic acids, ammonium salts or amides of the organic acids, or mixtures of ammonia and the acids to react with a long chain aliphatic amine, and then hydrolyzing the resulting product with alkali. After the alkali hydrolysis, the resulting product may be converted, if desired, into another alkaline salt.

The most distinguished feature of the present invention is that surface active agents having various physical and chemical properties can be readily obtained, according to the process herein described, by selecting the kind and amount of the long chain aliphatic amine used to form a hydrophobic group or by controlling the degree of polymerization of the polyimide to be used.

For example, surface active agents which differ in the proportion of the hydrophobic groups in the polymer molecule can be prepared by selecting the amount of the amine to be used when the polyimide is allowed to react with a hydrophobic aliphatic amine. Further, a surface active agent having different hydrophobic groups within the polymer molecule can be readily prepared by using simultaneously or separately different aliphatic amines as the long chain aliphatic amines to form hydrophobic groups.

In addition, products differing in properties such as solubility, hydrophobicity, etc., can be obtained by controlling the molecular weight of the polyimide to be used. Furthermore, since the present surface active agent contains an ionizable side chain, it exhibits the properties of a cationic or anionic surface active agent according to its ionizability. Since the present surface active agent contains no aromatic groups at all, there is no need to be concerned about toxicity.

The polyimide compound employed in the compositions of the present invention may be any type of compound as long as it contains the structural unit

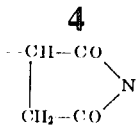

within the molecule as the main component, regardless of the starting material employed, the process used to prepare it, etc. Usually, the polyimide is obtained in high yield by heat-polymerizing the starting material.

As the long chain alkylamine employed in the present invention, primary and secondary amines having at least one long chain alkyl or alkenyl group having eight to 20 carbon atoms as a long chain aliphatic hydrocarbon group, or their derivatives may be used. Where a secondary amine is employed, the other substituent group may be an alkyl or alkenyl group of one to 20 carbon atoms. Typical of these amines are octyl amine, nonyl amine, decyl amine, undecyl amine, lauryl amine, tridecyl amine, myristyl amine, pentadecyl amine, palmityl amine, heptadecyl amine, stearyl amine, oleyl amine, N-ethyl-N-lauryl amine, N-ethyl-N-palmityl amine, N-methyl-N-lauryl amine, N-methyl-N-palmityl amine, N-(n- or i-)propyl-N-lauryl amine, N-(n-, i-, sec-or tert-)butyl-N-lauryl amine, etc. The amount of the alkyl amine to be used may be varied depending upon the properties desired in the surface active agent to be prepared but, usually, 0.005–1.0 equivalents are employed, and, preferably, 0.015–0.5 equivalents based on the imide groups of the polyimide compound.

The reaction of the polyimide with the aliphatic amine is carried out at room temperature or with heating for several hours in a suitable solvent whereby the desired product can be readily obtained. Solvents such as dimethylformamide, diethylformamide, dimethylacetamide, etc., for example, may be employed. When the reaction is carried out with heating, the temperature may be raised up to 100°C.

The alkali hydrolysis is carried out for a suitable time at a temperature in the range of 0° to 50°C, if necessary, with cooling. The reaction is generally complete after several minutes, but it may take several hours, in some cases, before it goes to completion. As the alkali, hydroxides or carbonates of alkali metals and alkaline earth metals, for example, NaOH, KOH, LiOH, RbOH, CsOH, $Li_2CO_3$, $Na_2CO_3$, $K_2CO_3$, $Rb_2CO_3$, $Cs_2CO_3$, barium hydroxide, etc., may be employed. The concentration of alkali employed can be varied widely depending upon the number of hydrophobic groups in the material to be hydrolyzed, but the preferred concentration is in the range of 0.1 to 10N.

After the alkali hydrolysis, the desired product, that is a polyaspartic acid derivative, is obtained. Further, the polyaspartic acid derivative may be converted into a derivative having a partially free acid group or into another alkaline salt by the well-known ion exhange method. For example, when the hydrolysis is carried out with barium hydroxide, the barium ions can be removed with dilute sulfuric acid after the hydrolysis, and the excess sulfate ions can be removed with barium carbonate (the latter step may be unnecessary in certain cases). The thus obtained polyaspartic acid derivative containing both amide groups and free acid groups is neutralized with aqueous ammonia, whereby a polyaspartic acid derivative partially containing amides and partially containing ammonium salts is obtained. In addition, a polyaspartic acid derivative partially containing amides and partially containing free acids can also be obtained by passing the reaction products through a column of a cationic exchange resin after the hydrolysis with sodium hydroxide. A similar result may be obtained when the following Examples are carried out using the aforementioned alkalis in place of NaOH or KOH.

As described above, the present process has the advantage that surface active agents having various properties as shown in the Examples can be prepared. Thus, suitable products can be produced according to the desired purpose for the product. In addition, the present products show no cloud point and have very good solubilizing ability, emulsifying and dispersing properties, as well as good foaming properties. Thus, the present products can be used for various purposes as surface active agents. For example, they can be utilized as foaming agents, solubilizing agents, dispersing agents, emulsifying agents, rust-proofing agents, fiber-treating agents, level dyeing agents and retarding agents.

The present surface active agents, in particular, have a structure resembling protein as the main chain, and have less toxicity. The surface active agents have the excellent advantage of being useful as an additive in cosmetics and medicaments.

Now the invention will be further explained referring to the following examples, but these examples are merely illustrative and do not restrict the scope of the present invention.

EXAMPLE 1

2 kg of L-aspartic acid is added to 6 l of tetralin. The solution is heated and the temperature is raised by steps up to 190°–210°C. The solution is kept at 190°–210°C for further 40 hours. With the progress of the reaction, the color of the resulting crystals changes from white to pink and further to light yellow. After the completion of the reaction, the precipitate is separated by filtration and washed twice with each 5 l of methanol and thereafter washed with 5 l of acetone. The obtained precipitate is dried in vacuo. Thus, 1489 g of an anhydropolyaspartic acid (molecular weight: about 5,000) is obtained.

970 g of the obtained anhydropolyaspartic acid [P] is dissolved in 5,000 ml of dimethylformamide, and 46.7 g of lauryl amine [K] is added to the resulting solution. The reaction is carried out at 50°C for 2 hours. After the reaction is completed, the reaction mixture is concentrated to dryness by distilling off the dimethylformamide under reduced pressure. 1,300 ml of a solution of 5N NaOH is added to the resulting solid material and the mixture is allowed to react for about 1 hour. The reaction mixture is then poured into 10 l of methanol with stirring and the precipitate which deposits is separated by filtration and dried in vacuo. After drying, a copolymer of lauryl $\alpha,\beta$-polyaspartate amide and sodium $\alpha,\beta$-polyaspartate is obtained in a 95 percent yield.

The relationship between the physical properties of the above-prepared surface active agent and the amount of lauryl amine for the surface active agent is shown below.

| [m]/[n] ratio* | 77 | 43.3 | 32.2 | 16.1 |
|---|---|---|---|---|
| [P] (g) | 9.7 | 9.7 | 9.7 | 9.7 |
| [K] (g) | 0.24 | 0.43 | 0.58 | 1.16 |
| Surface tension (dyn/cm) | | | | |
| (20°C, o.1% solution) | 47.4 | 39.1 | 41.6 | 53.5 |
| Aqueous solution | clear | clear | clear | clear |
| Slightly acidic aqueous solution | clear | clear | clear | clear |
| Cloud point | non | non | non | non |
| Solubilizing ability | good | good | very good | very good |
| Dispersing ability | good | good | good | very good |
| Foaming ability | very** good | very** good | very** good | Very** good |

*[m] = the equivalents of imido groups of the employed polyimide = [P]/97
[n] = the moles of the employed amine = [K]/185
[m]/[n] = [P]/[K] × 185/97
** much better than a polyoxyethylene-type nonionic surface active agent The above-prepared surface active agent exhibits properties of an amphoteric surface active agent.

EXAMPLE 2

9.7 g of the polyimide (molecular weight: 4,000) obtained by heat polymerizing maleamic acid at about 190°C is dissolved in 50 ml of dimethylformamide, and 2.3 g of oleyl amine is added to the resulting solution. The reaction is carried out at 60°C for 2.5 hours. After the reaction is completed, the reaction mixture is concentrated to dryness by distilling off the dimethylformamide under reduced pressure. 130 ml of a solution of 0.5N NaOH is added to the resulting solid material and the reaction is carried out for 30 minutes. The pH of the reaction solution is adjusted to 6.5 – 7.0 with 35 percent aqueous solution of HCl, and then the solution is freeze-dried to obtain a copolymer of oleyl $\alpha,\beta$-polyaspartate amide and $\alpha,\beta$-polyaspartic acid. The copolymer is obtained in a 97 percent yield.

Various surface active agents can be obtained by changing the ratio of oleyl amine to polyimide as in Example 1. When the molar ratio of oleyl amine is more than 4, the water solubility of the product is poor (With and increase in the amount of oleyl amine, the water solubility becomes poor.). However, the surface active agent prepared by the above Example has properties which are as good as the surface active agent prepared in Example 1.

The composition of a liquid shampoo employing the present surface active agent is given below.

| Surface active agent | 10 | g |
|---|---|---|
| Anhydrous sodium sulfate | 5 | g |
| Perfume | 0.5 | g |
| Water | 84.5 | g |

The above-mentioned shampoo is an excellent, clear, liquid shampoo since it scarcely irritates the skin and mucous membranes and has good affinity for, or miscibility with, the perfume and other ingredients.

EXAMPLE 3

19.5 g of the polyimide (molecular weight: 2,500), obtained by heat polymerizing the ammonium salt of maleic acid at about 190°C, is dissolved in 100 ml of diethylformamide, and 3.5 g of N-methyl-N-lauryl amine is added to the resulting solution. The reaction is carried out at 60°C for 2 hours. After the reaction completed, the reaction mixture is concentrated to dryness by distilling off the dimethylformamide under reduced pressure. 25 ml of a solution of 5N NaOH is added to the resulting solid residue and the mixture is allowed to react for 1 hour. After the reaction is completed, the solution is made slightly acidic with concentrated hydrochloric acid. The acidic solution is then poured into 500 ml of methanol with stirring and the precipitate which deposits is separated by filtration and dried in vacuo. After drying, a copolymer of N-methyl-N-lauryl α,β-polyaspartate amide and α,β-polyaspartic acid is obtained in a 96 percent yield.

The composition of a vanishing cream wherein the above-prepared surface active agent is employed is given below.

| Surface active agent | 25.0 g |
|---|---|
| Triethanol amine | 1.2 g |
| Glycerine | 10.0 g |
| Perfume | 0.9 g |
| Stearic acid | 5.0 g |
| Water | 57.9 g |

EXAMPLE 4

9.7 g of the polyimide (molecular weight: 1,500) obtained by heat polymerizing the ammonium salt of maleic acid at about 180°C is dissolved in 60 ml of dimethylformamide and 0.4 g of lauryl amine, and 1.0 g of palmityl amine are added to the resulting solution. The reaction is carried out at 70°C for 1.5 hours. After the reaction is completed, the reaction mixture is concentrated to dryness by distilling off dimethylformamide under reduced pressure. 33 ml of 2N KOH is added to the resulting residue and the reaction is allowed to proceed for 0.5 hours. After the reaction is completed, the solution is poured into 200 ml of methanol and the precipitate which deposits is separated by filtration and dried in vacuo. After drying, a copolymer of lauryl α,β-polyaspartate amide, palmityl α,β-polyaspartate amide and potassium α,β-polyaspartate is obtained in a 97 percent yield.

In the above reaction, various surface active agents can be synthesized by varying the ratio of the amount of lauryl amine and palmityl amine to that of the polyimide as in Example 1.

The composition of a detergent for tableware employing the above-prepared surface active agent is given below. The detergent scarcely irritates the skin and, in addition, is an excellent detergent for tableware.

| Surface active agent | 20 | g |
|---|---|---|
| Sodium citrate | 3 | g |
| Perfume | 0.5 | g |
| Anhydrous sodium sulfate | 3 | g |
| Water | 73.5 | g |

What is claimed:
1. A process for preparing a polyaspartic acid derivative which comprises reacting a polyimide having in its molecule the group

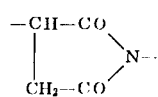

as a repeating unit, which is obtained by heat condensation of a compound selected from the group consisting of aspartic acid; ammonium salts of aspartic acid, malic acid, maleic acid and fumaric acid; and mono- and diamides of aspartic acid, malic acid, maleic acid and fumaric acid
with a primary or secondary amine represented by the formula

(wherein R' is a hydrogen atom or or an alkyl or alkenyl group having one to 20 carbon atoms and R'' is an alkyl or alkenyl group having 8 to 20 carbon atoms), the amount of which is 0.005 - 1.0 equivalent based on the imide groups of the polyimide
at room temperature or a higher one up to 100°C in a solvent in order to partially convert the repeating unit of polyimide into

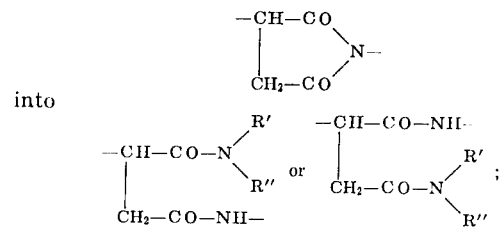

and hydrolyzing the resulting polyimide derivative with an alkali selected from alkali metal and alkaline earth metal hydroxides and carbonates in order to convert residual groups

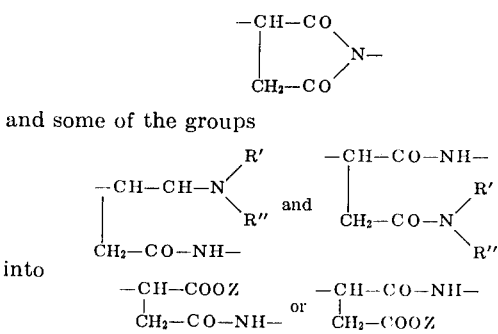

and some of the groups into

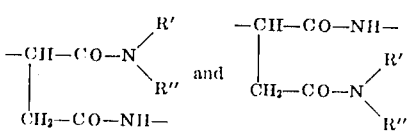

wherein Z represents a hydrogen atom, an alkali metal or an alkaline earth metal,
the finally produced polyaspartic acid derivative having in its molecule at least one of the groups together with at least one of the groups

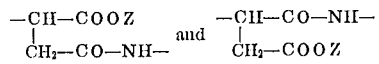

as a repeating unit.

2. The process of claim 1 wherein the amine is lauryl amine.

3. The process of claim 1 wherein the amine is oleyl amine.

4. The process of claim 1 wherein the amine is N-methyl-N-lauryl amine.

5. The process of claim 1 wherein the amine reactant is lauryl amine and palmityl amine.

6. The process of claim 1 wherein the polyimide is the product of the heat condensation of aspartic acid.

7. The process of claim 1 wherein the polyimide is the product of the heat condensation of maleic acid.

8. The process of claim 1 wherein the polyimide is the product of the heat condensation of the ammonium salt of maleic acid.

9. A polyaspartic acid derivative having in its molecule at least one of the groups

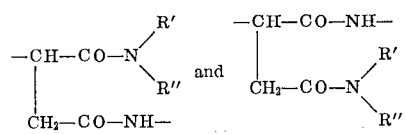

wherein R' is a hydrogen atom or an alkyl or alkenyl group having one to 20 carbon atoms and R" is an alkyl or alkenyl group having eight to 20 carbon atoms
together with at least one of the groups

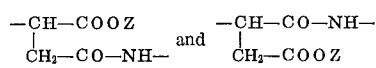

wherein Z represents a hydrogen atom, an alkali metal or an alkaline earth metal
as a repeating unit, which is obtained by reacting a polyimide having in its molecule the group

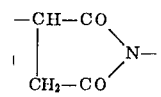

as a repeating unit, which is obtained by heat condensation of a compound selected from the group consisting of aspartic acid; ammonium salts of aspartic acid, malic acid maleic acid and fumaric acid; and mono- and diamides of aspartic acid, malic acid, maleic acid and fumaric acid
with a primary or secondary amine represented by the formula

in an amount of 0.005 - 1.0 equivalent based on the imide groups of the polyimide at room temperature or a higher one up to 100°C in a solvent in order to partially convert the repeating unit of polyimide into

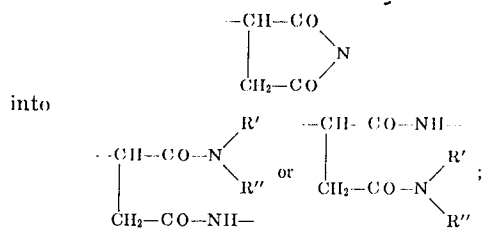

and hydrolyzing the resulting polyimide derivative with an alkali selected from alkali metal and alkaline earth metal hydroxides and carbonates in order to convert residual groups

and some of the groups

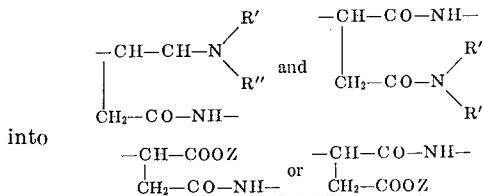

10. The composition of claim 9 wherein the polyamino acid is a copolymer of lauryl α,β-polyaspartate amide and sodium α,β-polyaspartate.

11. The composition of claim 9 wherein the polyamino acid is a copolymer of oleyl α,β-polyaspartate amide and α,β-polyaspartic acid.

12. The composition of claim 9 wherein the polyamino acid is a copolymer of N-methyl-N-lauryl α,β-polyaspartate amide and α,β-polyaspartic acid.

13. The composition of claim 9 wherein the polyamino acid is a copolymer of lauryl α,β-polyaspartate amide, palmityl α,β-polyaspartate amide and potassium α,β-polyaspartate.

14. A detergent composition containing as a surface active agent a polyaspartic acid derivative of claim 9.

15. A cosmetic composition containing as a surface active agent a polyaspartic acid derivative of claim 9.

16. A process of claim 1, wherein the suitable solvent is one selected from dimethylformamide, diethylformamide and dimethylacetamide.

17. A polyaspartic acid derivative of claim 9 wherein the suitable solvent is one selected from dimethylformamide, diethylformamide and dimethylacetamide.

18. A detergent composition containing as a surface active agent a polyaspartic acid derivative of claim 17.

19. A cosmetic composition containing as a surface active agent a polyaspartic acid derivative of claim 17.

* * * * *